United States Patent
Weiss et al.

(10) Patent No.: US 7,079,316 B2
(45) Date of Patent: Jul. 18, 2006

(54) MICROSCOPE AND MICROSCOPY METHOD FOR PRODUCING OVERLAY IMAGES

(75) Inventors: Albrecht Weiss, Linden (DE); Michael Ganser, Giessen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 48 days.

(21) Appl. No.: 10/840,133

(22) Filed: May 6, 2004

(65) Prior Publication Data
US 2004/0223215 A1   Nov. 11, 2004

(30) Foreign Application Priority Data
May 9, 2003   (DE) ................................ 103 21 091

(51) Int. Cl.
*G02B 21/06* (2006.01)
*G02B 21/00* (2006.01)

(52) U.S. Cl. .................. 359/386; 359/368; 359/371; 359/495

(58) Field of Classification Search ........ 359/368–390, 359/495–500
See application file for complete search history.

(56) References Cited

U.S. PATENT DOCUMENTS

| | | | | |
|---|---|---|---|---|
| 4,515,447 A | | 5/1985 | Weimer et al. | 359/388 |
| 4,698,498 A | * | 10/1987 | Mahoney et al. | 250/234 |
| 5,420,717 A | * | 5/1995 | Tabata | 359/371 |
| 5,604,591 A | * | 2/1997 | Kitagawa | 356/491 |
| 5,638,206 A | | 6/1997 | Sumiya et al. | 359/368 |
| 6,674,574 B1 | * | 1/2004 | Aono | 359/383 |
| 2001/0040723 A1 | | 11/2001 | Kusake | 359/370 |

FOREIGN PATENT DOCUMENTS

| | | | | |
|---|---|---|---|---|
| DE | 3214268 | | 10/1983 | |
| DE | 3542218 | | 7/1986 | |
| DE | 3542218 | | 4/1994 | |
| EP | 0510329 | | 10/1992 | |
| JP | 5-257066 | * | 10/1993 | 359/386 |
| JP | 2001-91822 | * | 4/2001 | 359/383 |

* cited by examiner

*Primary Examiner*—Thong Q Nguyen
(74) *Attorney, Agent, or Firm*—Darby & Darby

(57) ABSTRACT

A microscope includes an interference contrast transmitted-light device having an analyzer disposed in the microscope imaging beam path, the analyzer causing a beam deflection. A fluorescence device is provided, the fluorescence device and the interference contrast transmitted-light device being selectably and alternatively insertable into the imaging beam path. A pair of glass wedge plates are arranged behind the analyzer in the imaging direction so as to compensate to zero for the beam deflection caused by the analyzer.

11 Claims, 3 Drawing Sheets

MICROSCOPE AND MICROSCOPY METHOD FOR PRODUCING OVERLAY IMAGES

Priority is claimed to German patent application 103 21 091.1, the subject matter of which is hereby incorporated by reference herein.

The invention concerns a microscope having an interference contrast transmitted-light device that includes an analyzer in the imaging beam path. The invention further concerns a microscopy method for producing overlay images.

BACKGROUND

In microscopic examinations and documentation, it often happens that multiple exposures and assembled images that depict different aspects of the specimen are produced. The images thus produced are generated using various contrasting methods or various microscopy methods, and then combined into one image. The various image constituents are then displayed, for example, using so-called "false colors." For example, the samples to be examined are often marked with various fluorescent dyes that can be excited and observed using different filter combinations. The images achieved in this fashion, each produced with a specific filter combination, are subsequently assembled into a single cumulative image.

The case considered here refers to the combination of images acquired by means of interference contrast transmitted-light (ICT) microscopy and fluorescence microscopy. The image generated with the ICT method then shows the unstained biological specimen as a whole. The image produced by means of fluorescence microscopy, on the other hand, shows only particular and specific markings at certain points. The images produced with the two methods are then assembled into one overlay image.

The overlay images produced in this fashion are each imaged onto a camera. It is desirable, in producing an overlay image of this kind, for the ICT image to be located on the CCD chip of the camera at exactly the same point as the fluorescence images or a bright-field transmitted-light image. The reason is that if the images are imaged onto the CCD chip with an offset from one another, evaluation of the image is negatively affected.

In the ICT method, a polarizing filter that serves as the analyzer is located in the imaging beam path of the microscope. This analyzer is usually arranged between the microscope objective and the tube lens. Since the analyzer has a transmissivity of only approx. 30% for unpolarized light, it is also usually introduced into the beam path only for the ICT method. For the fluorescence measurement or fluorescence observation, in which weak intensities generally occur, the analyzer is removed from the beam path.

Polarizing filters of planar configuration, such as those used in microscopy, usually comprise a stretched polarizing film that is cemented between two glass plates. Such polarizing filters have the disadvantage that incident light is slightly deflected. The reasons for this beam deflection include the stretched polarizing film itself, wedge-shaped cemented surfaces, and possibly wedge-shaped glass plates. Known polarizing filters of this type thus produce beam deflections of up to 3 minutes. If the microscope has, for example, a tube lens with a focal length of 200 millimeters, an analyzer of this kind with a beam deflection of 3 minutes produces approximately a 175-μm offset of the intermediate image of the sample, With a CCD camera having a pixel size of approx. 8 μm, the result is that the analyzer causes the image to be offset by approximately 20 pixels.

Until now, the offset produced on the CCD chip between the ICT image and the fluorescence image had to be tolerated, meaning that the associated loss in the quality of the overlay images necessarily had to be accepted. Alternatively, the image offset of the individual images in the overlay image was compensated for using software in the context of digital image acquisition or the processing of the overlay images, which required appropriate software and hardware and is time-consuming.

SUMMARY OF THE INVENTION

It is therefore an object of the present invention to provide a microscope in which the undesirable offset of the individual images in the overlay image is eliminated.

The present invention provides a microscope having an interference contrast transmitted-light device that encompasses an analyzer in the imaging beam path. The microscope includes a fluorescence device, the fluorescence device and the interference contrast transmitted-light device being selectably and alternatively insertable into the imaging beam path. Two glass wedge plates are additionally arranged behind the analyzer in the imaging direction, and are embodied and oriented in such a way that the total beam deflection of the two glass wedge plates compensates to zero for the beam deflection produced by the analyzer.

According to the present invention, two glass wedge plates are additionally arranged in the imaging beam path between the analyzer and the camera, i.e. immediately behind the analyzer in the imaging direction. The analyzer comprises an aligned polarizing filter, meaning that this polarizing filter is deliberately oriented (e.g. in the north/south direction) in terms of the vibration direction that is allowed to pass. The glass wedge plates can, in principle, be different. It has proven advantageous in terms of alignment, however, if two identical glass wedge plates are used. The glass wedge plates have a wedge angle $\alpha$ (=alpha) and impose on the passthrough beam a beam deflection $\delta$ (=delta), $\delta$ corresponding to approximately half the wedge angle. The wedge angle $\alpha$ and thus the beam deflection $\delta$ of the two glass wedge plates are selected so that $\delta$ is approximately half the magnitude of the maximum deflection resulting from the polarizing filter. This means that $\delta$ is equal to approximately 1.5' (=minutes).

During assembly, the two glass wedge plates are first mounted rotatably with respect to one another and with respect to the (already secured) polarizing filter. An alignment of the two glass wedge plates then takes place during manufacture of the microscope. This can be achieved, for example, using an autocollimation device with which very small beam deflections (on the order of one second) can be measured. In this operation, the glass wedge plates are aligned in such a way that the beam deflection of the two glass wedge plates compensates for the beam deflection of the polarizing filter. The two glass wedge plates are then immobilized in that position and thus prevented from rotating further.

BRIEF DESCRIPTION OF THE DRAWINGS

The present invention will be explained in more detail below with reference to the schematic drawings.

DETAILED DESCRIPTION

Figure 1:
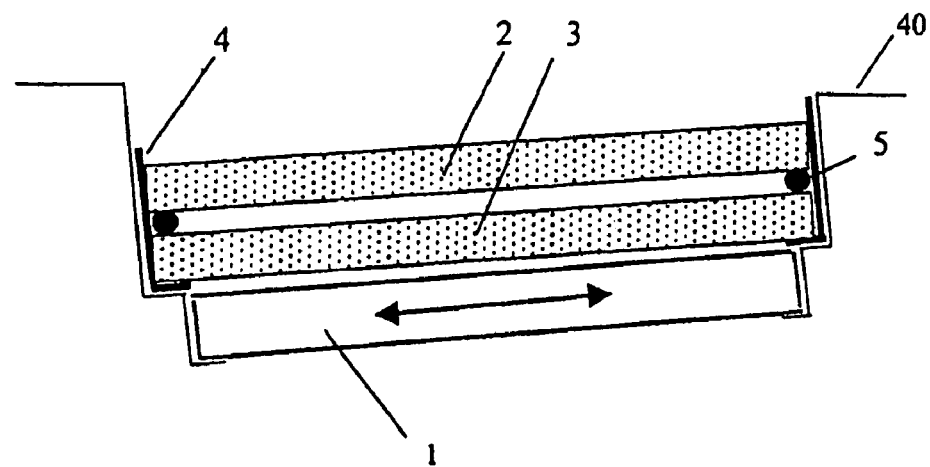
FIG. 1 shows the arrangement of the two glass wedge plates directly behind the analyzer.

In FIG. 1, a polarizing filter is arranged as analyzer 1. The vibration direction that is allowed to pass is indicated schematically by a double arrow. Arranged directly behind analyzer 1 in the direction of the camera (not depicted), i.e. in the imaging direction, are a first glass wedge plate 2 and a second glass wedge plate 3. They are located one above another within a receiving ring 4, first glass wedge plate 2 and second glass wedge plate 3 being separated from one another by a spacer ring 5. Spacer ring 5 permits a rotation of first glass wedge plate 2 with respect to second glass wedge plate 3 and vice versa. Glass wedge plates 2 and 3 can in this fashion be aligned with respect to one another in such a way that the total beam deflection cumulatively generated by the two glass wedge plates 2 and 3 together exactly compensates for the beam deflection of analyzer 1. Analyzer 1 and glass wedge plates 2 and 3 are arranged on a common mount 40.

Figure 2:
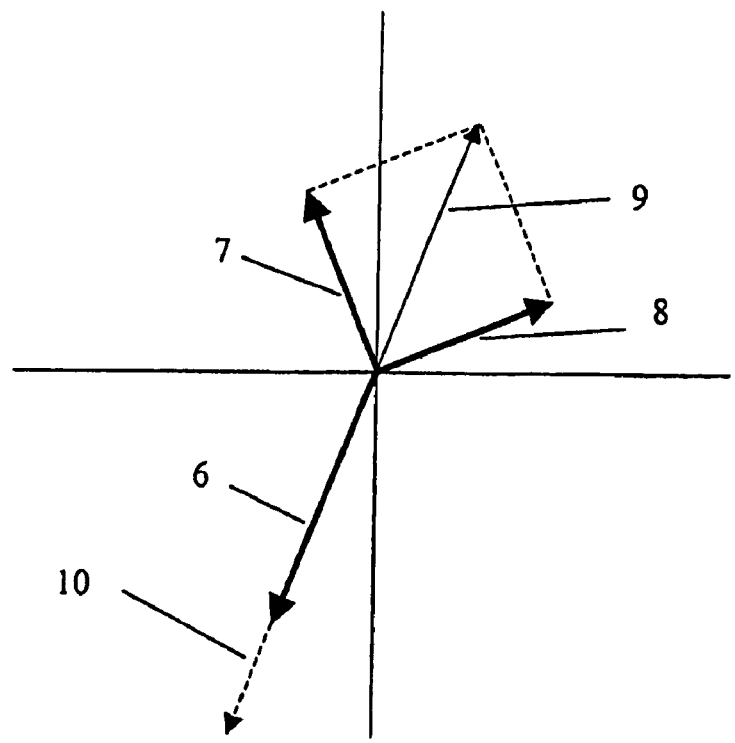
FIG. 2 is a vectorial depiction of the beam deflection in the arrangement shown in FIG. 1.

FIG. 2 shows the beam deflections that occur in the arrangement of FIG. 1. Vectors are used for the illustration. Vector 6 reproduces the deflection as a result of analyzer 1; in this example, vector 6 is depicted as approx. ⅔ of the maximum possible deflection. Vector 7 shows the beam deflection resulting from first glass wedge plate 2. Vector 8 shows the beam deflection resulting from second glass wedge plate 3. Vectorial addition of vector 7 and vector 8 yields vector 9, which indicates the resulting total beam deflection due to the combined action of first glass wedge plate 2 and second glass wedge plate 3. As shown, the magnitude of vector 9 (i.e. the total beam deflection due to the two glass wedge plates 2 and 3) and the magnitude of vector 6 (i.e. the beam deflection resulting from analyzer 1) are identical. Since vector 6 and vector 9 are oppositely directed, the beam deflection of analyzer 1 is thus compensated for by means of the two glass wedge plates 2 and 3.

Figure 3:
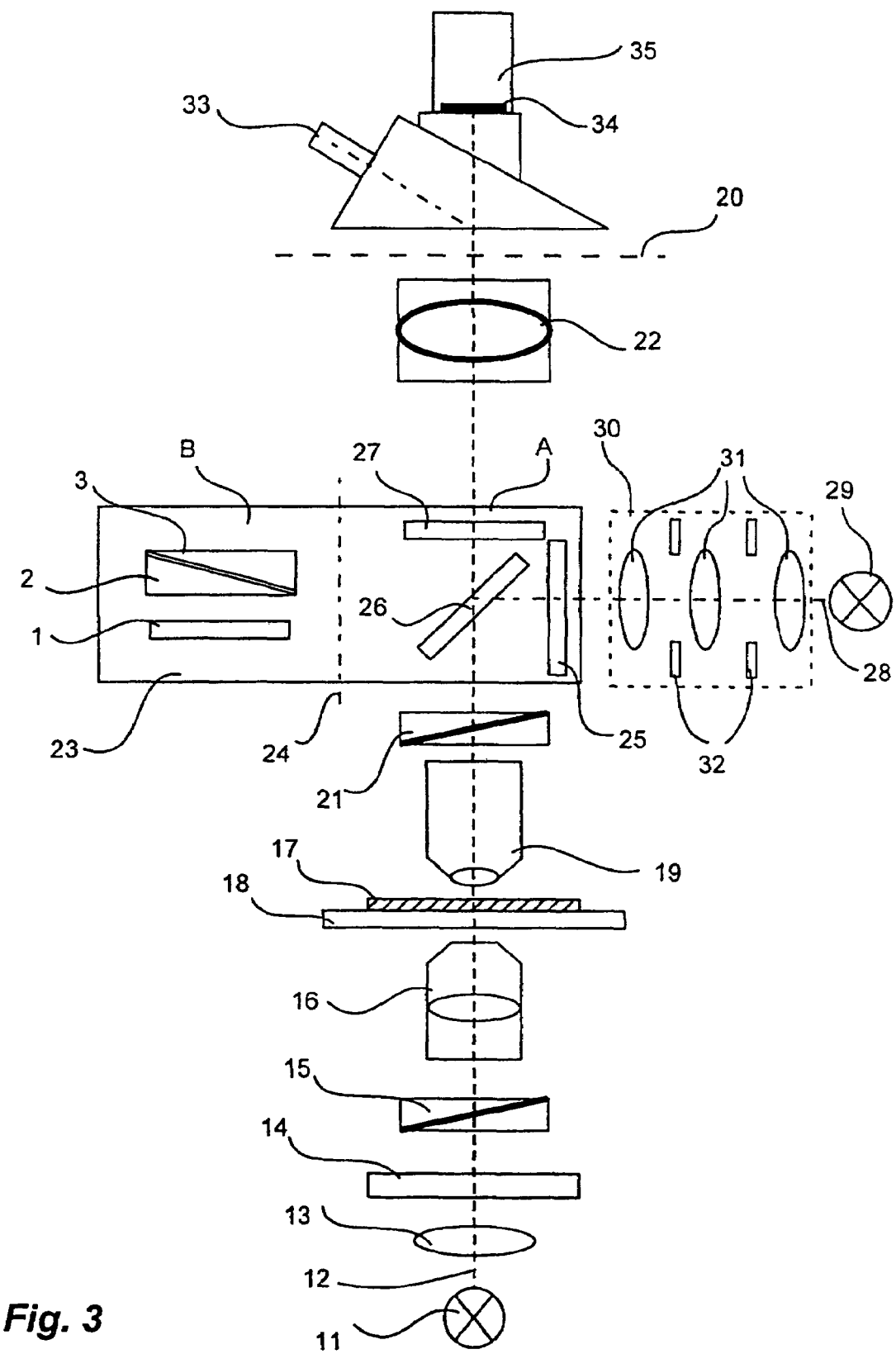
FIG. 3 shows a microscope having a fluorescence device in the working position.

FIG. 3 shows a microscope having a fluorescence device in the working position. A transmitted-light beam 12 proceeds from a transmitted-light source 11. The light of transmitted-light source 11 passes successively through an illumination optical system 13, a polarizer 14, a first Wollaston prism 15, and a condenser 16. The beam emerging from condenser 16 illuminates a sample 17 that is placed on a microscope stage 18.

The light passing through sample 17 is captured by an objective 19 and is imaged by it into an intermediate image plane 20. Between objective 19 and intermediate image plane 20, the beam passes through a second Wollaston prism 21 and a tube optical system 22 which, inter alia, determines the position of intermediate image plane 20.

Arranged between second Wollaston prism 21 and tube optical system 22 is a device changer 23 that has at least two regions A and B for the reception of devices. In the embodiment depicted here, device changer 23 is mounted rotatably about a rotation axis 24, such that by rotation about rotation axis 24, one of the two regions A or B can be alternatively introduced into the beam path. In another embodiment (not depicted here), device changer 23 is constructed as a slider displaceable laterally in the beam path. Device changer 23 can furthermore comprise additional regions (not depicted here) having further devices, for example filter devices.

In the setting of device changer 23 shown here, its region A is located in the beam path of the microscope. A fluorescence device is arranged in this region. It comprises an excitation filter 25, a semitransparent beam splitter 26, and a barrier filter 27. This fluorescence device is also referred to as a fluorescence cube.

To allow sample 17 to be examined using the fluorescence device, an incident-light beam 28 is conveyed to the fluorescence device. That beam proceeds from an incident-light source 29 and passes through an incident-light illumination optical system 30 having several lens elements 31 and apertures 32. The light of incident-light beam 28 enters region A laterally and passes through excitation filter 25, which permits only certain spectral fluorescence wavelength regions of the illuminating light to pass.

The incident light is then deflected by means of beam splitter 26 toward objective 19 and is directed through objective 19 onto sample 17. The incident light produces a fluorescence excitation in specific fluorochromes introduced into sample 17. From sample 17, the light travels through objective 19, second Wollaston prism 21, beam splitter 26, and barrier filter 27, into intermediate image plane 20. The image of sample 17 generated there can be viewed by means of one or more eyepieces 33. The image is also imaged onto CCD chip 34 of a camera 35.

Figure 4:
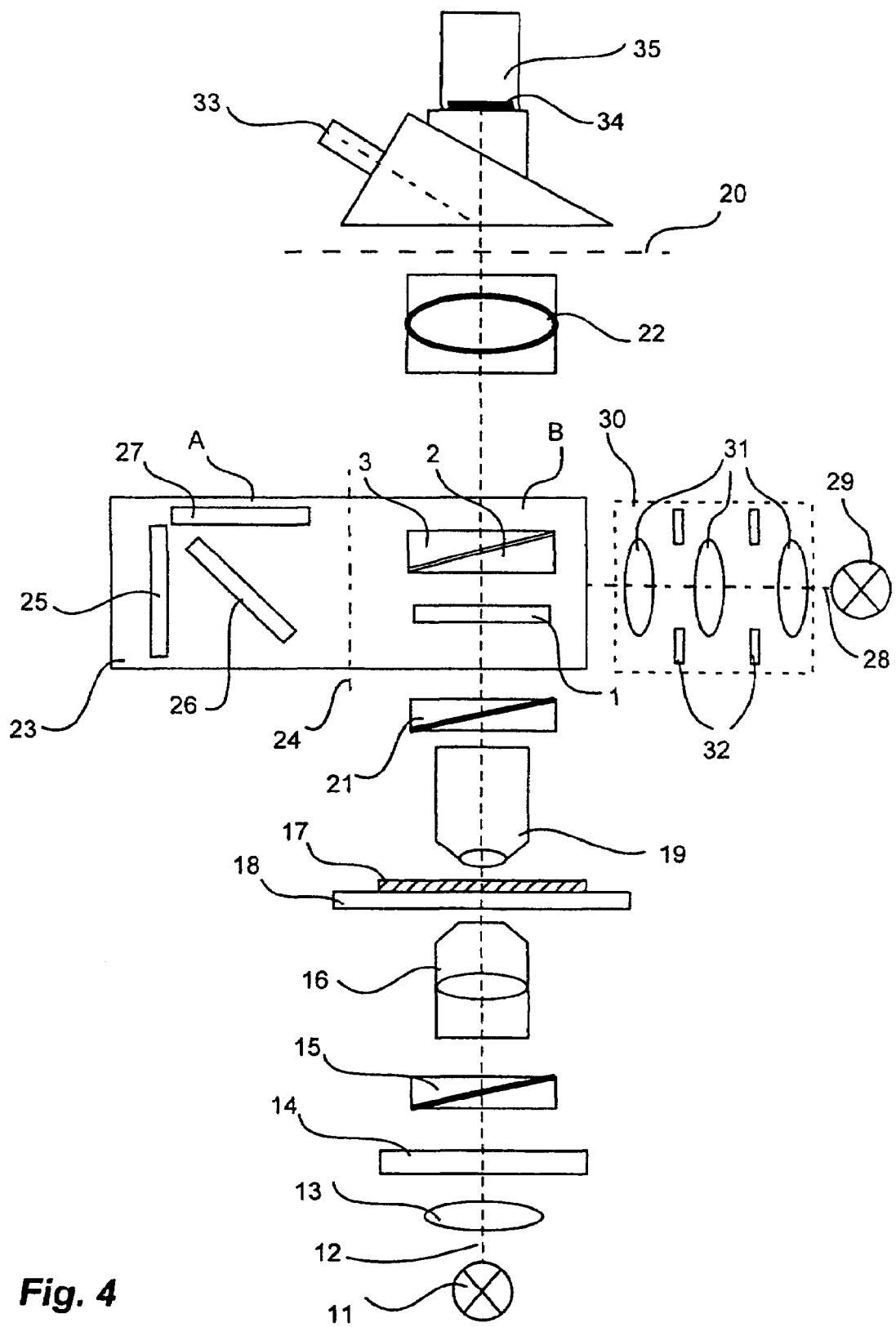
FIG. 4 shows a microscope having in the working position an arrangement to compensate for the image offset produced by the analyzer.

FIG. 4 shows the microscope of FIG. 3 with an interference contrast transmitted-light device arranged entirely in the beam path, a compensation for the beam deflection of analyzer 1 being performed according to the present invention.

As already described, transmitted-light beam 12, in which illuminating optical system 13, one polarizer 14, first Wollaston prism 15, and condenser 16 are arranged, proceeds from transmitted-light source 11. The light of transmitted-light beam 12 illuminates sample 17 and is imaged by objective 19 into intermediate image plane 20. Behind objective 19, the beam passes through second Wollaston prism 21 and enters device changer 23.

With device changer 23 in the position depicted here, its region B is located in the beam path of the microscope. Device changer 23 is closed off at the side so that incident light from incident-light beam 28 cannot enter region B. An analyzer 1 is arranged in region B of device changer 23. This analyzer 1, together with polarizer 14, first Wollaston prism 15 and second Wollaston prism 20, constitutes an interference contrast transmitted-light device.

This analyzer 1 comprises a polarizing film and produces a beam offset of the beam passing through, as explained previously. This beam offset results in an image offset of the interference contrast transmitted-light image on CCD chip 34 of camera 35 with respect to the fluorescent image generated in the microscope setting shown in FIG. 3.

According to the present invention, this image offset is now compensated for optically. For that purpose, two glass wedge plates referred to as first glass wedge plate 2 and second glass wedge plate 3 are additionally arranged immediately behind analyzer 1 in the imaging direction. Glass wedge plates 2 and 3 are embodied and oriented in such a way that the total beam deflection generated by the two glass wedge plates 2 and 3 together compensates to zero for the beam deflection occurring behind analyzer 1.

The image offset on CCD chip 34 of camera 35 of the interference contrast transmitted-light image with respect to the fluorescence image is thus compensated for. With precise alignment of the glass wedge plates 2 and 3 with respect to one another and with respect to analyzer 1, the interference contrast transmitted-light image and the fluorescence image are imaged on CCD chip 34 of camera 35 with accurate superposition of each pixel.

An overlay image is generated in the following fashion:

A first microscope image is generated using the interference contrast transmitted-light device, and acquired with the camera.

A second microscope image is then generated using the fluorescence device, and likewise acquired with the camera.

Since compensation for the image offset of the first microscope image with respect to the second microscope image is accomplished with optical means, by the fact that according to the present invention, the two glass wedge plates 2, 3 are arranged in the interference contrast transmitted-light device directly behind the analyzer 1 in the imaging direction, an overlay image can be produced directly. The overlay image is produced by superimposition of the first microscope image and second microscope image, by transferring the first microscope image and the second microscope image respectively into an image memory and adding (stacking) them there to within pixel accuracy. The possibility also exists of adding up several (i.e. more than two) images of the aforesaid type, and performing further image processing steps.

The invention thus offers the advantage that a complex software-assisted compensation for the image offset is no longer necessary. Superimposition of the interference contrast transmitted-light image and the fluorescence image to within pixel accuracy results in an overlay image whose image quality is greatly improved, and which permits more accurate evaluation of the resulting overlay image.

PARTS LIST

1 Analyzer
2 First glass wedge plate
3 Second glass wedge plate
4 Receiving ring
5 Spacer ring
6 Vector of beam deflection by analyzer 1
7 Vector of beam deflection by first glass wedge plate
8 Vector of beam deflection by second glass wedge plate
9 Vector of total beam deflection by both glass wedge plates 2, 3
10 Vector of maximum beam deflection by analyzer 1
11 Transmitted-light source
12 Transmitted-light beam
13 Illumination optical system
14 Polarizer
15 First Wollaston prism
16 Condenser
17 Sample
18 Microscope stage
19 Objective
20 Intermediate image plane
21 Second wollaston prism
22 Tube optical system
23 Device changer
24 Rotation axis
25 Excitation filter
26 Semitransparent beam splitter
27 Barrier filter
28 Incident-light beam
29 Incident-light source
30 Incident-light illumination optical system
31 Lens elements
32 Aperture
33 Eyepieces
34 CCD chip
35 Camera

What is claimed is:

1. A microscope comprising:
   an interference contrast transmitted-light device including an analyzer, the analyzer being disposed in an imaging beam path of the microscope and causing a beam deflection;
   a fluorescence device, the fluorescence device and the interference contrast transmitted-light device being selectably and alternatively insertable into the imaging beam path; and
   a first glass wedge plate and a second glass wedge plate disposed behind the analyzer in an imaging direction so as to compensate to zero for the beam deflection caused by the analyzer.

2. The microscope as recited in claim 1 wherein the first and second glass wedge plates are disposed immediately behind the analyzer in the imaging direction.

3. The microscope as recited in claim 1 wherein the first and second glass wedge plates are disposed relative to each other and relative to the analyzer so as to accurately image, on a CCD chip of a camera with accurate superposition of respective pixels, a first microscope image provided by the interference contrast transmitted-light device and a second microscope image provided by the fluorescence device.

4. The microscope as recited in claim 1 wherein the analyzer and the first and second glass wedge plates are disposed in a common mount.

5. The microscope as recited in claim 1 wherein the analyzer and the first and second glass wedge plates are removably insertable into the imaging beam path.

6. The microscope as recited in claim 1 wherein the analyzer includes a polarizing film.

7. The microscope as recited in claim 1 wherein the first and second glass wedge plates each have a respective same wedge angle.

8. A method for providing overlay images, the method comprising the steps of:
   providing a first microscope image using an interference contrast transmitted-light device and acquiring the first microscope image using a camera, the interference contrast transmitted-light device including an analyzer;
   providing a second microscope image using a fluorescence device and acquiring the second microscope image using the camera;
   superimposing the first microscope image and the second microscope image so as to provide an overlay image; and
   disposing a first glass wedge plate and a second glass wedge plate in the interference contrast transmitted-light device behind the analyzer in an imaging direction so that a total beam deflection of the glass wedge plates compensates to zero for a beam deflection caused by the analyzer so as to compensate to zero for an image offset of the first microscope image relative to the second microscope image due to the beam deflection.

9. The method as recited in claim 8 wherein the disposing is performed so as to dispose the first and second glass wedge plates directly behind the analyzer.

10. The method as recited in claim 8 wherein the superimposing is performed by superimposing the first microscope image and the second microscope image on a CCD chip of a camera to within pixel accuracy so as to directly generate the overlay image.

11. The method as recited in claim 8 wherein the superimposing is performed by respectively transferring the first and second microscope images into an image memory so as to add the images to within pixel accuracy.

* * * * *